United States Patent
Anton Falcon et al.

(10) Patent No.: US 9,634,477 B2
(45) Date of Patent: Apr. 25, 2017

(54) METHOD FOR ADJUSTING AN INRUSH CURRENT OF A DOMESTIC APPLIANCE, AND DOMESTIC APPLIANCE, IN PARTICULAR COOKING RANGE, COMPRISING A CONTROL UNIT FOR CARRYING OUT THE METHOD

(75) Inventors: Daniel Anton Falcon, Saragossa (ES); Jose Maria De la Cuerda Ortin, Saragossa (ES); Ignacio Garde Aranda, Saragossa (ES); Pablo Jesus Hernandez Blasco, Cuarte de Huerva (ES); Sergio Llorente Gil, Saragossa (ES); Carlos Vicente Mairal Serrano, Saragossa (ES); Paul Muresan, La Cartuja (ES); Diego Puyal Puente, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 856 days.

(21) Appl. No.: 14/005,362

(22) PCT Filed: Feb. 29, 2012

(86) PCT No.: PCT/IB2012/050947
§ 371 (c)(1),
(2), (4) Date: Sep. 16, 2013

(87) PCT Pub. No.: WO2012/127343
PCT Pub. Date: Sep. 27, 2012

(65) Prior Publication Data
US 2014/0001883 A1    Jan. 2, 2014

(30) Foreign Application Priority Data

Mar. 23, 2011 (ES) .................................. 201130416

(51) Int. Cl.
*H02B 1/24* (2006.01)
*H01H 35/00* (2006.01)
(Continued)

(52) U.S. Cl.
CPC ................. *H02H 3/08* (2013.01); *H05B 6/04* (2013.01); *Y10T 307/74* (2015.04)

(58) Field of Classification Search
CPC ............ H02H 3/08; H05B 6/04; Y10T 307/74
See application file for complete search history.

(56) References Cited

U.S. PATENT DOCUMENTS 4,233,498 A * 11/1980 Payne ................. G05D 23/1913
219/448.12
4,333,049 A * 6/1982 Yui .................... G01R 19/0092
324/102

(Continued)

FOREIGN PATENT DOCUMENTS

CN    10182439 A    12/2007
DE    10301523 B3    6/2004

OTHER PUBLICATIONS

International Search Report PCT/IB2012/050947 dated May 24, 2012.
National Search Report ES P201130416 dated Jul. 10, 2013.

*Primary Examiner* — Fritz M Fleming
*Assistant Examiner* — Rasem Mourad
(74) *Attorney, Agent, or Firm* — Michael E. Tschupp; Andre Pallapies

(57) ABSTRACT

In a method for setting an inrush current of a domestic appliance to a region-specific inrush current, the domestic appliance is switched to a setting mode, in which the inrush current is limited at the domestic appliance to one of a number of region-specific inrush currents that are selectable at the domestic appliance.

32 Claims, 1 Drawing Sheet

(51) Int. Cl.
*H01H 83/00* (2006.01)
*H02H 3/00* (2006.01)
*H02H 3/08* (2006.01)
*H05B 6/04* (2006.01)

(56) References Cited

U.S. PATENT DOCUMENTS

| | | | | |
|---|---|---|---|---|
| 5,299,113 | A * | 3/1994 | England | G05B 19/042 |
| | | | | 700/17 |
| 6,664,519 | B2 * | 12/2003 | Hammelsbacher | F24C 7/083 |
| | | | | 219/445.1 |
| 2002/0189464 | A1 * | 12/2002 | Schneider | H05B 3/746 |
| | | | | 99/331 |
| 2003/0215255 | A1 * | 11/2003 | Kinouchi | G03G 15/205 |
| | | | | 399/69 |
| 2005/0189888 | A1 | 9/2005 | Federman et al. | |
| 2005/0189904 | A1 | 9/2005 | Wills et al. | |
| 2006/0125419 | A1 * | 6/2006 | Chen | H02J 1/08 |
| | | | | 315/291 |

\* cited by examiner

METHOD FOR ADJUSTING AN INRUSH CURRENT OF A DOMESTIC APPLIANCE, AND DOMESTIC APPLIANCE, IN PARTICULAR COOKING RANGE, COMPRISING A CONTROL UNIT FOR CARRYING OUT THE METHOD

BACKGROUND OF THE INVENTION

The invention relates to a method for setting an inrush current of a domestic appliance to a region-specific inrush current. The invention also relates to a domestic appliance, in particular a cooktop, having a control unit for carrying out the method.

It is known that different inrush currents are provided to supply households with energy in different countries. It is for example known that in Europe a plurality of inrush currents are preset in different countries. For example in Spain, France and Great Britain it is known that inrush currents are limited to 25 A or 32 A or 13 A per phase. In contrast in Germany a three-phase inrush current is preset, which is limited to 16 A per phase. Domestic appliances must therefore be tailored to the individual inrush current supply. In this context it is currently necessary for an individual embodiment of a domestic appliance to be produced for each country in order to be able to meet the specific requirements relating to the inrush current. This is very complex for the development phase and therefore also very cost-intensive.

A cooking appliance having a satellite-assisted location system is known from DE 103 01 526 B3. The cooking appliance can use this satellite-assisted location system to set itself for the power and gas supplies that are standard locally or at least to warn that corresponding setting is required. However the local power supply is only possible if the cooking appliance has a buffer battery, as such identification has to take place before connection to the power network with the cooking appliance according to the prior art.

BRIEF SUMMARY OF THE INVENTION

The object of the present invention is to create a method and a domestic appliance, with which it is possible to avoid providing different appliance variants for different region-specific requirements in respect of energy supply.

With an inventive method for setting an inrush current of a domestic appliance to a region-specific inrush current the domestic appliance is switched to a setting mode to perform the setting of the inrush current. In this setting mode the inrush current is set or limited to the desired region-specific inrush current.

A method is therefore provided for a domestic appliance, which allows this one appliance to be set to different region-specific inrush currents.

The method therefore makes it possible for the required and desired region-specific inrush current to be selected and set from a number of selectable region-specific inrush currents that can be selected at the domestic appliance itself. A domestic appliance therefore has the function that one of a number of possible region-specific inrush currents is selected and it is no longer necessary to develop multiple separate domestic appliances which then only have one region-specific inrush current each, for which they are designed, and said inrush current can no longer be changed.

Such an inventive method can significantly reduce the number of domestic appliances of a domestic appliance type that have to be developed differently. It is therefore not necessary to create separate country-specific variants of a domestic appliance type.

Provision is preferably made for at least one function unit of the domestic appliance to have a number of operating stages and for a region-specific inrush current to be assigned to each operating stage in setting mode. It is therefore possible to perform the setting of the inrush current in a very simple and easily comprehensible manner.

Provision is preferably made for the assigned operating stage to be set within a predetermined time interval after setting the setting mode to select the region-specific inrush current. By predetermining such a time window it is possible on the one hand to perform the setting relatively quickly and on the other hand it is possible to distinguish the procedure during setting mode clearly from other operating modes, for example during the desired performance of an actual operating sequence of the domestic appliance. This avoids unwanted setting errors. It also counteracts safety-critical situations in respect of unwanted settings.

Provision is preferably made for the set inrush current to be displayed visually and for the selected region-specific inrush current to be stored by switching off the domestic appliance. Such a procedure allows the user to be informed very reliably and certainly of the setting undertaken. It also prevents the occurrence of setting errors. The set and selected inrush current is then advantageously also automatically stored by switching off the domestic appliance. This also improves safety, as compared with user-defined storage such automatism ensures in all instances that the set inrush current also remains for the future, in particular until the next time setting mode is implemented.

Provision is preferably made for the inrush current of a cooktop configured as the domestic appliance to be set and for the cooktop to be switched on to activate setting mode. Setting mode also only operates when the at least two cooking zones of the cooktop, which are configured as function units, are unoccupied. This means that setting mode and the further proceeding only operate when the cooking zones are not occupied with cookpots or other preparation vessels. As a result corresponding safety measures are also taken in order not to trigger operation erroneously in an unwanted manner during a preparation process.

Provision is preferably made for all the cooking zones to be set to a cooking stage provided as the operating stage, to which the desired region-specific inrush current is assigned in setting mode, within a time interval after the cooktop has been switched on, in particular within one minute.

Provision is preferably made for an inrush current of 20 A to be assigned to a first cooking stage of a cooking zone, an inrush current of 16 A to be assigned to a second cooking stage, an inrush current of 13 A to be assigned to a third cooking stage and an inrush current of 10 A to be assigned to a fourth cooking stage. This means for example that when the cooktop is to be operated and connected for example in the energy supply network in Germany, cooking stage two is selected for all the cooking zones in setting mode, thereby selecting and setting the assigned region-specific inrush current of 16 A.

Setting the maximum possible inrush current also ensures that safe and reliable operation is ensured in respect of the energy supply in this specific region or the country.

As far as the further procedure in setting mode is concerned, provision is then made for each cooking zone to be switched off after the inrush current has been set for the cooking zones. This also provides a very specific sequence to prevent setting errors being performed or it would be incorrectly interpreted due to the failure that such setting of the inrush current is performed during another operating program sequence.

It is particularly advantageous here that the switching off of the cooking zones is performed in a predetermined sequence. In particular the cooking zones are switched off counterclockwise. Provision is made in particular for the cooking zones to be switched off starting with the bottom right cooking zone, when the cooktop comprises for example at least four separate cooking zones, which are disposed in a matrix.

Provision is preferably made for the set inrush current of the cooktop to be displayed visually. It is particularly advantageous here for there to be a flashing display in the region of preferably one or more cooking zone surfaces. This particularly favors user perceptibility.

Provision is preferably made for the cooktop to be switched off after the region-specific inrush current has been set, thereby storing the set inrush current. This also allows sequence automatism to be created, which also ensures that the desired setting is undertaken and remains for the long term. Provision is preferably made for setting mode to be terminated by the storing of the set inrush current as brought about by the switching off of the cooktop. This also creates an automatism, so that possible subsequent preparation processes can be performed without being impaired or restricted.

The termination of setting mode therefore takes place in particular when the cooktop as a whole has been switched off using the main switch.

The invention further relates to a domestic appliance, in particular a cooktop, having a control unit for carrying out an inventive method or an advantageous embodiment thereof.

BRIEF DESCRIPTION OF THE DRAWINGS

An exemplary embodiment of the invention is described in more detail below based on schematic drawings, in which.

DETAILED DESCRIPTION OF EXEMPLARY EMBODIMENTS OF THE PRESENT INVENTION

Figure 1:
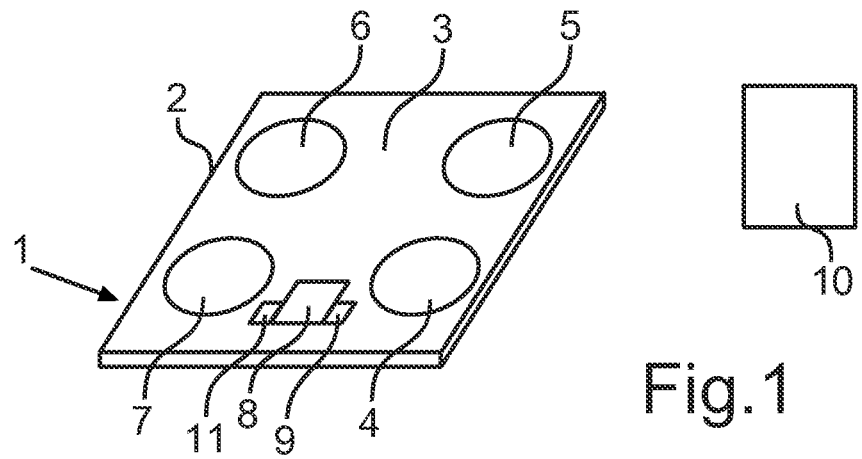
FIG. 1 shows a perspective view of an exemplary embodiment of an inventive cooktop.

Identical elements or those of identical function are shown with identical reference characters in the figures.

FIG. 1 shows a perspective view of a cooktop 1 configured as an induction cooktop. It comprises a cooktop plate 2, which can be made for example from glass or glass ceramic. Cooking zones 4, 5, 6 and 7 are configured on an upper face 3 of the cooktop plate 2 in the exemplary embodiment. Preparation vessels can be positioned on these for food preparation purposes.

The cooktop 1 also comprises an operating apparatus 8. In the exemplary embodiment this is integrated in the cooktop 1 and can be operated by touching the upper face of the cooktop plate 2. The operating apparatus 8 is configured at least partially with touch-sensitive operating elements. The cooktop 1 also comprises a control unit 9, which is preferably assigned to the operating apparatus 8.

The cooktop 1 is designed so that it can be connected to different inrush currents in different countries. To this end the maximum inrush current can be set in a region-specific manner. This means that the cooktop 1 can be operated without any problem in different countries, in which different maximum inrush currents are preset.

For example if the cooktop 1 is connected to an energy supply network 10, which permits a maximum inrush current of 16 A, the cooktop 1 can be set accordingly for this.

To this end provision is made for this setting to be performed in a specific setting mode. To this end the cooktop 1 is first switched on by actuating a main switch 11. Provision is also made for the cooking zones 4 to 7 to be free of preparation vessels to implement setting mode. This means that there are then no preparation vessels positioned on said cooking zones 4 to 7 and the cooking zones 4 to 7 are therefore unoccupied.

It is then also necessary in this setting mode for all the cooking zones 4 to 7 to be set to the desired region-specific inrush current within a predetermined time period, in particular within 60 seconds. Provision is made here for cooking stages of the cooking zones 4 to 7 that can be set in setting mode to be assigned specific inrush currents and therefore by selecting a cooking stage it is also possible to select the desired region-specific inrush current.

In the exemplary embodiment provision is made for the cooking zones 4 to 7 to each have at least four cooking stages in a cooktop 1. An inrush current of 20 A is assigned to the first cooking stage, an inrush current of 16 A is assigned to the second cooking stage, an inrush current of 13 A is assigned to the third cooking stage and an inrush current of 10 A is assigned to the fourth cooking stage here. This is stored and predetermined correspondingly in the electronics unit of the cooktop 1.

Figure 2:
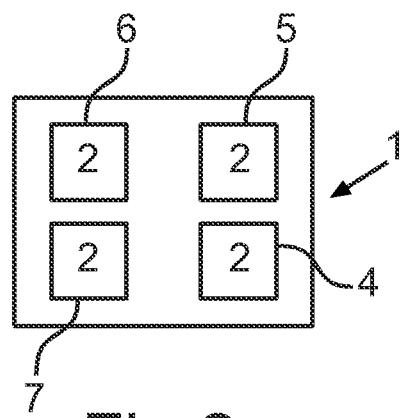
FIG. 2 shows a top view of the cooktop during a first setting phase in setting mode.

If cooking stage two is selected within the abovementioned time interval for all four cooking zones 4 to 7, the region-specific inrush current of 16 A is selected for all the cooking zones 4 to 7. This is also displayed visually according to the diagram in FIG. 2. Provision can also be made here for the cooking stage numbers "2" to be displayed visually in each instance in the region of the cooking zone surfaces of the cooking zones 4 to 7. Provision can however also be made for the cooking zones 4 to 7 also to be shown symbolically in respect of their matrix-type arrangement in the region of the operating apparatus 8 and visual displays are present there which then show the cooking stage selections shown respectively in FIG. 2.

Figure 3:
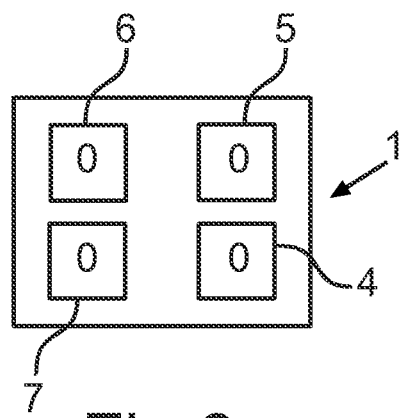
FIG. 3 shows a top view of the cooktop in a second phase in setting mode.

The cooking zones 4 to 7 are then switched off in setting mode. This takes place in a very specific sequence. In the exemplary embodiment provision is made for the cooking zone 4 to be switched off first, then the cooking zone 5, then the cooking zone 6 and finally the cooking zone 7. To this end FIG. 3 shows the situation in which all the cooking zones 4 to 7 have already been switched off. The number "0" indicates and visually displays the switched off state here.

Figure 4:
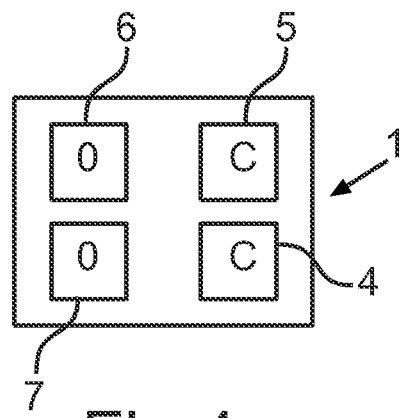
FIG. 4 shows a top view of the cooktop in a third phase of setting mode.
Figure 5:
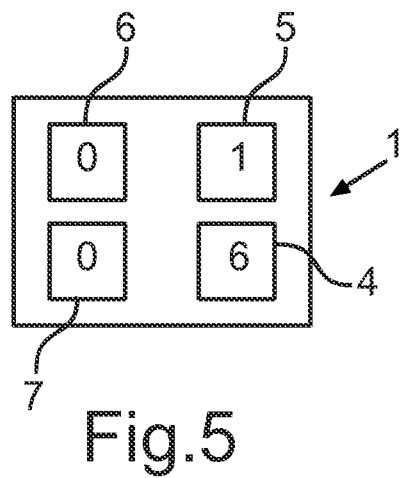
FIG. 5 shows a top view of the cooktop in a fourth phase of setting mode.

A visual display of the value of the selected and set region-specific inrush current then takes place according to the diagrams in FIG. 4 and FIG. 5, with alternating flashing for example also taking place in the two right-hand cooking zone surfaces of the cooking zones 4 and 5 or alternatively in the display region of the operating apparatus 8, with the letter "C" for current being displayed first and then switching to the value 16, as shown in FIG. 5.

If the selected region-specific inrush current is correct, the user can switch off the cooktop 1 as a whole by actuating the main switch 11. The set inrush current is then stored subject to automatic control by the control unit 9 and remains set until a change is made in a setting mode. The cooktop 1 can therefore be tailored very simply and easily to different region-specific inrush currents. It is also possible, based on the setting scenario described, to activate setting mode again and to select and set the region-specific inrush current of 20 A for example by setting the cooking stage 1, in order to operate the cooktop 1 in a different region.

The invention claimed is:

1. A method for setting an inrush current of a domestic appliance to a region-specific inrush current, the method comprising:
    switching the domestic appliance to a setting mode configured for a user to select a region-specific inrush current from a plurality of region-specific inrush currents; and
    limiting the inrush current of the domestic appliance to the region-specific inrush current in response to a selection by the user.

2. The method of claim 1, further comprising
    providing at least one function unit of the domestic appliance with a plurality of operating stages, and
    assigning a region-specific inrush current of the plurality of region-specific inrush currents to each of the plurality of operating stages in the setting mode.

3. The method of claim 2, further comprising setting an assigned operating stage within a predetermined time interval after setting the setting mode to select the region-specific inrush current.

4. The method of claim 3, further comprising:
    visually displaying the selected region-specific inrush current; and
    storing the selected region-specific inrush current in response to a switching off of the domestic appliance.

5. The method of claim 2, wherein the domestic appliance is a cooktop, and wherein the cooktop includes a plurality of function units configured as cooking zones,
    the method further comprising:
    switching on the cooktop to activate the setting mode, and leaving at least two of the plurality of function units configured as cooking zones unoccupied.

6. The method of claim 5, further comprising:
    setting, after the cooktop has been switched on, all of the cooking zones within a time interval to a cooking stage provided as the operating stage, to which the selected region-specific inrush current is assigned in the setting mode.

7. The method of claim 6, wherein the time interval is one minute.

8. The method of claim 6, further comprising:
    switching off each of the cooking zones after the region-specific inrush current has been set for all of the cooking zones.

9. The method of claim 8, wherein the cooking zones are switched off in a predetermined sequence.

10. The method of claim 8, wherein the cooking zones are switched off in a counterclockwise sequence.

11. The method of claim 8, further comprising visually displaying the set region-specific inrush current in one of a region of a surface of the cooking zones and a region of an operating apparatus of the cooktop.

12. The method of claim 8, wherein the cooktop is switched off after setting of the region-specific inrush current, and thereby storing the set inrush current.

13. The method of claim 12, wherein the setting mode is terminated in response to the storing of the set inrush current after the cooktop has been switched off.

14. A domestic appliance, comprising:
    a control unit configured to switch the domestic appliance to a setting mode configured for a user to select a region-specific inrush current from a plurality of region-specific inrush currents,
    wherein the control unit is configured to limit the inrush current of the domestic appliance to the region-specific inrush current in response to a selection by the user.

15. The domestic appliance of claim 14, constructed in the form of a cooktop.

16. The domestic appliance of claim 14, further comprising:
    at least one function unit having a plurality of operating stages,
    wherein the control unit is configured to assign a region-specific inrush current of the plurality of region-specific inrush currents to each of the plurality of operating stages in the setting mode.

17. The domestic appliance of claim 16, wherein the control unit is configured to set an assigned operating stage within a predetermined time interval after setting the setting mode to select the region-specific inrush current.

18. The domestic appliance of claim 17, further comprising:
    a display configured to visually display the selected region-specific inrush current; and
    a storage unit configured to store the selected region-specific inrush current in response to a switching off of the domestic appliance.

19. The domestic appliance of claim 16, constructed in the form of a cooktop having a plurality of function units configured as cooking zones,
    wherein the control unit is configured to switch on the cooktop to activate the setting mode, while at least two of the plurality of function units configured as cooking zones remain unoccupied.

20. The domestic appliance of claim 19, wherein the control unit is configured to set, after the cooktop has been switched on, all of the cooking zones within a time interval to a cooking stage provided as the operating stage, to which the selected region-specific inrush current is assigned in the setting mode.

21. The domestic appliance of claim 20, wherein the time interval is one minute.

22. The domestic appliance of claim 20, wherein the control unit is configured to switch off each of the cooking zones after the region-specific inrush current has been set for all of the cooking zones.

23. The domestic appliance of claim 22, wherein the control unit is configured to switch off the cooking zones in a predetermined sequence.

24. The domestic appliance of claim 22, wherein the control unit is configured to switch off the cooking zones in a counterclockwise sequence.

25. The domestic appliance of claim 20, further comprising a display configured to visually display the set region-specific inrush current in a region of a surface of the cooking zones.

26. The domestic appliance of claim 20, further comprising:
    an operating apparatus of the cooktop configured for the user to select the region-specific inrush current from the plurality of region-specific inrush currents; and a display configured to visually display the set region-specific inrush current in a region of the operating apparatus.

27. The domestic appliance of claim 20, wherein the control unit is configured to switch off the cooktop after setting of the region-specific inrush current, and further comprising a storage unit configured to store the set region-specific inrush current after the cooktop has been switched off.

28. The domestic appliance of claim 27, wherein the control unit is configured to terminate the setting mode is in response to the storing of the set region-specific inrush current after the cooktop has been switched off.

29. A domestic appliance, comprising:
at least one function unit having a plurality of operating stages, wherein each of the plurality of operating stages is configured for an inrush current of a region of a plurality of different regions;
an operating apparatus configured for a user to select an operating stage of the plurality of operating stages corresponding to a particular inrush current of a particular region of the plurality of different regions in which the domestic appliance will be operated; and
a control unit configured to assign the selected operating stage having the particular inrush current to the at least one function unit.

30. The domestic appliance of claim 29, wherein the domestic appliance includes a cooktop,
wherein the at least one function unit includes a cooktop plate having at least one cooking zone, and
wherein the control unit is configured to assign the selected operating stage having the particular inrush current to the at least one cooking zone.

31. The domestic appliance of claim 29, wherein the domestic appliance includes a cooktop,
wherein the at least one function unit includes a cooktop plate having a plurality of cooking zones and each of the plurality of cooking zones includes a plurality of operating stages, each configured for an inrush current of the plurality of different regions, and
wherein the control unit is configured to assign the selected operating stage having the particular inrush current to each of the plurality of cooking zones.

32. The domestic appliance of claim 29, further comprising:
a display configured to visually display the selected operating stage having the particular inrush current; and
a storage unit configured to store the selected operating stage having the particular inrush current in response to a switching off of the domestic appliance.

* * * * *